US009332433B1

(12) United States Patent
Dotan et al.

(10) Patent No.: US 9,332,433 B1
(45) Date of Patent: May 3, 2016

(54) DISTRIBUTING ACCESS AND IDENTIFICATION TOKENS IN A MOBILE ENVIRONMENT

(71) Applicant: EMC Corporation, Hopkinton, MA (US)

(72) Inventors: Yedidya Dotan, Newton, MA (US); Lawrence N. Friedman, Arlington, MA (US); Riaz Zolfonoon, Concord, MA (US); Gareth Richards, Woodstock (GB); Guoying Luo, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 226 days.

(21) Appl. No.: 14/041,125

(22) Filed: Sep. 30, 2013

(51) Int. Cl.
*H04L 29/06* (2006.01)
*H04W 12/06* (2009.01)

(52) U.S. Cl.
CPC ............... *H04W 12/06* (2013.01); *H04L 63/08* (2013.01); *H04L 63/0807* (2013.01); *H04L 63/0815* (2013.01); *H04L 63/0853* (2013.01); *H04L 63/0876* (2013.01)

(58) Field of Classification Search
CPC ............ H04L 63/0815; H04L 63/0807; H04L 63/105; H04L 63/10; H04L 63/08; H04L 63/0876; H04L 2463/082; H04L 63/0884; H04L 9/3213; H04L 9/3234; G06F 21/41; G06F 21/44; G06F 21/31; G06F 17/30566
USPC ...................... 726/2, 3, 4, 5, 7, 8, 9
See application file for complete search history.

(56) References Cited

U.S. PATENT DOCUMENTS

| | | | |
|---|---|---|---|
| 8,095,660 B2 | 1/2012 | Monjas Lorente et al. | |
| 8,533,803 B2 | 9/2013 | Cha et al. | |
| 8,756,665 B2* | 6/2014 | Pieczul et al. | 726/5 |
| 8,782,766 B1* | 7/2014 | Metke | G06F 21/41 726/7 |
| 8,819,803 B1* | 8/2014 | Richards et al. | 726/9 |
| 8,839,376 B2 | 9/2014 | Durbha et al. | |
| 8,850,546 B1* | 9/2014 | Field et al. | 726/8 |
| 8,949,953 B1* | 2/2015 | Khitrenovich | H04L 63/08 726/4 |
| 8,959,609 B1* | 2/2015 | Newstadt et al. | 726/9 |
| 8,959,650 B1* | 2/2015 | Richards et al. | 726/26 |
| 9,009,806 B2* | 4/2015 | Hyland et al. | 726/8 |
| 2013/0014239 A1* | 1/2013 | Pieczul et al. | 726/7 |
| 2014/0007198 A1* | 1/2014 | Durbha et al. | 726/4 |
| 2014/0096177 A1* | 4/2014 | Smith et al. | 726/1 |
| 2014/0101679 A1* | 4/2014 | Yin et al. | 725/5 |
| 2014/0310792 A1* | 10/2014 | Hyland et al. | 726/8 |
| 2014/0337953 A1* | 11/2014 | Banatwala et al. | 726/8 |

* cited by examiner

*Primary Examiner* — Tae Kim
(74) *Attorney, Agent, or Firm* — BainwoodHuang (57) ABSTRACT

A technique performs authentication before delivering a token to a client device. The technique involves receiving a first message from a first application on the client device, the first message including a token request and a first set of authentication factors. The technique further involves receiving a second message from a second application on the client device, the second message including an authentication request and a second set of authentication factors. The technique further involves generating a result message which (i) provides access to a token for use by the client device when the first set of authentication factors is consistent with the second set of authentication factors, and (ii) rejects the token request when the first set of authentication factors is inconsistent with the second set of authentication factors. The client device may be a mobile device, and the first and second messages may be received via wireless communications.

21 Claims, 5 Drawing Sheets

DISTRIBUTING ACCESS AND IDENTIFICATION TOKENS IN A MOBILE ENVIRONMENT

BACKGROUND

When a user of a computerized device accesses a service from a service provider, the computerized device may first need to obtain a token from a token provider, and then deliver the token to the service provider. After the service provider properly receives and validates the token from the computerized device, the service provider allows the computerized device to access the service on behalf of the user.

Security Assertion Markup Language (SAML) defines a standard which enables computerized devices to acquire SAML tokens (or assertions) from identity providers, and then obtain access to services from service providers using the SAML tokens. Often the identity providers and the service providers are separate organizations/entities.

SUMMARY

Unfortunately, there are deficiencies to the above-described conventional approach to acquiring tokens from token providers, and then obtaining access to services from service providers using the tokens. For example, mobile devices are particularly vulnerable to session hijacking. Along these lines, mobile device communications are wireless and thus easily receivable by others. Additionally, mobile browsers are, by definition, extendible and thus susceptible to malicious plug-ins. This leaves open opportunities for a malicious person to configure an apparatus to impersonate the mobile device of a legitimate user and obtain a token from a token provider using that apparatus. Once the token provider provides the token to the apparatus of the malicious person, the malicious person is able to access resources from the service provider.

In contrast to the above-described conventional approach which is vulnerable to session hijacking (i.e., where a token provider inadvertently provides a token to the apparatus of a malicious person), improved techniques involve delivery of a token from a token server to a mobile device which runs two different applications, i.e., a browser application and a separate security application, both of which provide device information to the token server. The separate security application may be provided to the mobile device and installed in the mobile device of the legitimate user in a highly secure manner. The token server is then able to compare the device information from two independent sources of the mobile device rather than rely solely on device information from mobile device's browser (i.e., a potential security weak point). The token server is then able to confirm that the device information from both sources is consistent before reliably delivering the token to the mobile device of the legitimate user.

One embodiment is directed to a method of performing authentication. Such a method can be performed by a token server. The method includes receiving, by processing circuitry of the token server, a first message from a first application running on a client device, the first message including a token request and a first set of authentication factors. The method further includes receiving, by the processing circuitry, a second message from a second application running on the client device, the second message including an authentication request and a second set of authentication factors. The method further includes generating, by the processing circuitry, an authentication result message which (i) provides access to a token for use by the client device when the first set of authentication factors is consistent with the second set of authentication factors, and (ii) rejects the token request when the first set of authentication factors is inconsistent with the second set of authentication factors.

In some arrangements, the client device is a mobile device. In these arrangements, the first and second messages may be received via wireless communications.

In some arrangements, receiving the first message from the first application running on the mobile device includes obtaining the first message from a browser application which is constructed and arranged to access a resource from a service provider (SP) server. In these arrangements, receiving the second message from the second application running on the mobile device includes obtaining the second message from a security application which is constructed and arranged to (i) collect the second set of authentication factors on the mobile device and (ii) send the second set of authentication factors to the processing circuitry independently of the browser application running on the mobile device.

In some arrangements, the processing circuitry of the token server includes (i) an identity provider (IDP) server and (ii) an authentication server. In these arrangements, obtaining the first message from the browser application includes acquiring the first set of authentication factors by the IDP server. Additionally, obtaining the second message from the security application includes acquiring the second set of authentication factors by the authentication server in a manner which is out of band of the IDP server.

In some arrangements, the method further includes receiving, by the IDP server, another message from the browser application running on the mobile device via wireless communications, the other message including a token identifier which identifies the token (i.e., a handle to the token). In these arrangements, the method further includes providing, by the IDP server, a response message to the mobile device in response to the other message from the browser application.

In some arrangements, the other message from the browser application further includes a third set of authentication factors. In these arrangements, the response message includes the token for use by the mobile device when the IDP server successfully matches the first set of authentication factors with the third set of authentication factors. However, the response message includes a token rejection when the IDP server does not successfully match the first set of authentication factors with the third set of authentication factors.

In some arrangements, the method further includes selecting a particular token from multiple tokens stored in a token database of the IDP server based on the token identifier. Here, the response message includes the particular token selected from multiple tokens stored in the token database of the IDP server.

In some arrangements, the method further includes delivering the token from the authentication server to the IDP server for storage in the token database in a manner which is out of band with the mobile device. That is, the authentication result message may simply include the token identifier while the actual token is sent from the authentication server to the IDP server. Then, the actual token can be delivered from the IDP server to the mobile device during the other message/response message exchange between the mobile device and the IDP server. These arrangements are well suited if the token is relatively large (e.g., a SAML assertion or similar form).

In some arrangements, the particular token is a bearer token that authenticates the user to the SP server in accordance with a bearer subject confirmation method.

In some arrangements, the method further includes providing, by the IDP server, an augmented universal resource locator (URL) string in response to the first message from the browser application, the augmented URL string directing the browser application to automatically launch the security application on the mobile device.

In some arrangements, when the authentication result message provides access to the token for use by the mobile device, the authentication result message includes a token identifier and directs the security application running on the mobile device to point the browser application to the IDP server to retrieve the token from the IDP server using the token identifier.

In some arrangements, the first set of authentication factors of the first message includes a first set of mobile device fingerprints which distinguish the mobile device from other mobile devices. Additionally, second set of authentication factors of the second message includes a second set of mobile device fingerprints which distinguish the mobile device from other mobile devices. Furthermore, the method further includes comparing the first set of mobile device fingerprints to the second set of mobile device fingerprints to determine whether the first message and the second message were received from the same mobile device.

In some arrangements, the first set of authentication factors of the first message includes a first set of biometric data, and the second set of authentication factors of the second message includes a second set of biometric data. In these arrangements, the method further includes comparing the first set of biometric data to the second set of biometric data to determine whether the first message and the second message were received from the same user.

It should be understood that, in the cloud context, various portions of the processing circuitry can be formed by remote computer resources distributed over a network. Such a computing environment is capable of providing certain advantages such as enhanced fault tolerance, load balancing, processing flexibility, etc.

Another embodiment is directed to a method of obtaining a token from a token server. Such a method can be performed by a smart device such as a tablet, a smart phone, etc. The method includes providing, by the mobile device, a first message from a first application running on the mobile device to remote processing circuitry of the token server via wireless communications, the first message including a token request and a first set of authentication factors. The method further includes providing, by the mobile device, a second message from a second application running on the mobile device to the remote processing circuitry via wireless communications, the second message including an authentication request and a second set of authentication factors. The method further includes receiving, by the mobile device, an authentication result message from the remote processing circuitry, the authentication result message (i) providing access to a token for use by the mobile device when the first set of authentication factors is consistent with the second set of authentication factors, and (ii) rejecting the token request when the first set of authentication factors is inconsistent with the second set of authentication factors.

In some arrangements, providing the first message from the first application running on the mobile device includes sending the first message using a browser application which is constructed and arranged to access a resource from a service provider (SP) server. In these arrangements, providing the second message from the second application running on the mobile device includes sending the second message using a security application which is constructed and arranged to (i) collect the second set of authentication factors on the mobile device and (ii) send the second set of authentication factors to the remote processing circuitry independently of the browser application running on the mobile device.

In some arrangements, the remote processing circuitry of the token server includes (i) an identity provider (IDP) server and (ii) an authentication server. In these arrangements, sending the first message using the browser application includes transmitting the first set of authentication factors to the IDP server, and sending the second message from the security application includes transmitting the second set of authentication factors to the authentication server in a manner which is out of band of the IDP server.

In some arrangements, the method further includes receiving an augmented universal resource locator (URL) string from the IDP server in response to the first message and, in response to the URL string, automatically launching the security application on the mobile device.

In some arrangements, the method further includes collecting a first set of user biometric data for inclusion in the first set of authentication factors of the first message; and collecting a second set of user biometric data for inclusion in the second set of authentication factors of the second message.

Other embodiments are directed to electronic systems and apparatus, processing circuits, computer program products, and so on. Some embodiments are directed to various methods, electronic components and circuitry which are involved in distributing access and identification tokens in a mobile environment.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to delivery of a token from a token server to a mobile device which runs two different applications, i.e., a browser application and a separate security application, both of which provide device information to the token server. The separate security application may be provided to the mobile device and installed in the mobile device of the legitimate user in a highly secure manner. The token server is then able to compare the device information from two independent sources of the mobile device rather than rely solely on device information from mobile device's browser (i.e., a potential security weak point). The token server is then able to confirm that the device information from both sources is consistent before delivering the token to the mobile device.

Figure 1:
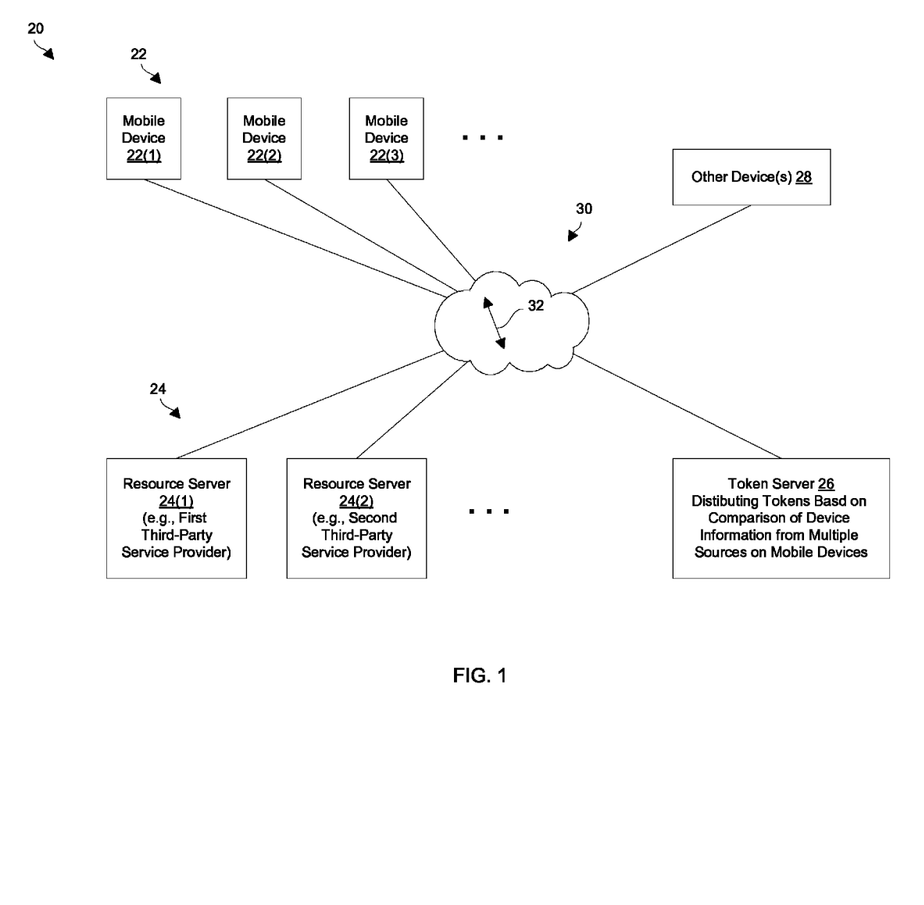
FIG. 1 is block diagram of an electronic environment in which a token server delivers a token to a mobile device based on multiple device information sources on the mobile device.

FIG. 1 shows an electronic environment 20 in which a token server delivers a token to a mobile device based on multiple device information sources of the mobile device. The electronic environment 20 includes mobile devices 22(1), 22(2), 22(3), . . . (collectively, mobile devices 22), resource servers 24(1), 24(2), . . . (collectively, resource servers 24), a token server 26, other device(s) 28, and a communications medium 30.

Each mobile device 22 is controlled by a respective user and is constructed and arranged to perform useful work on behalf of that user (e.g., access files, access email, perform online transactions, play games, communicate with other users, etc.). During such activity, the users may need to access resources from the resource servers 24. As will be explained in further detail shortly, such access requires the mobile devices 22 to obtain tokens from the token server 26 and then provide the tokens to the resource servers 24.

The resource servers 24 are constructed and arranged to provide access to resources. In particular, each resource server 24 requires a user to provide a token from the token server 26 prior to granting access to a requested resource. Each resource server 24 may be operated by a different organization or entity. Examples of suitable resource servers 24 include database access, email access, file access, VPN access, access to games, login access, account access, authorization to perform certain types of transactions (e.g., product/service purchase, bank account transaction, brokerage transactions, etc.), access to applications (e.g., customer relationship management or CRM software), and so on.

The token server 26 is constructed and arranged to distribute tokens to mobile devices 22 based on device information from multiple sources on the mobile devices 22. Such tokens (or assertions) are then used by the mobile devices 22 to access resources from the resource servers 24.

The other devices 28 represent additional apparatus in the electronic environment 20 which may are may not be involved in resource access. For example, the other devices 28 may include non-mobile user devices such as personal computers, user terminals and workstation, stationary game consoles, and so on which also communicate with the token server 26 for access tokens. Additionally, the other devices 28 may include equipment which belongs to a malicious person who tries to gain access to a resource via session hijacking.

The communications medium 30 is constructed and arranged to connect the various components of the electronic environment 20 together to enable these components to exchange electronic signals 32 (e.g., see the double arrow 32). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, users of the mobile devices 22 are able to access resources from the resource servers 24 by activating applications on their mobile devices 22. For example, a user may launch a browser application to access CRM resources from a CRM service provider (e.g., see the resource server 24(1)). On a conventional smart phone or tablet, the operating browser would be redirected to an identity server to obtain a token which the browser would then use to access the CRM resources from the CRM service provider.

However, as will be explained in further detail shortly, each mobile device 22 runs a security application which is separate from the browser application. To obtain a token from the token server 26, a mobile device 22 provides the token server 26 with a first set of device information via the browser, and a second set of device information via the security application. The token server 26 provides a token to the mobile device 26 only if the two sets of device information are consistent with each other. Such operation prevents a malicious person from overcoming the security of the token server 26 by hijacking a mobile device session (i.e., appearing as the mobile device of a legitimate user) and acquiring a token from the token server 26 to access a restricted resource. Furthermore, the use of the security application enables better device fingerprinting and collecting of biometrics. Further details will now be provided with reference to FIG. 2.

Figure 2:
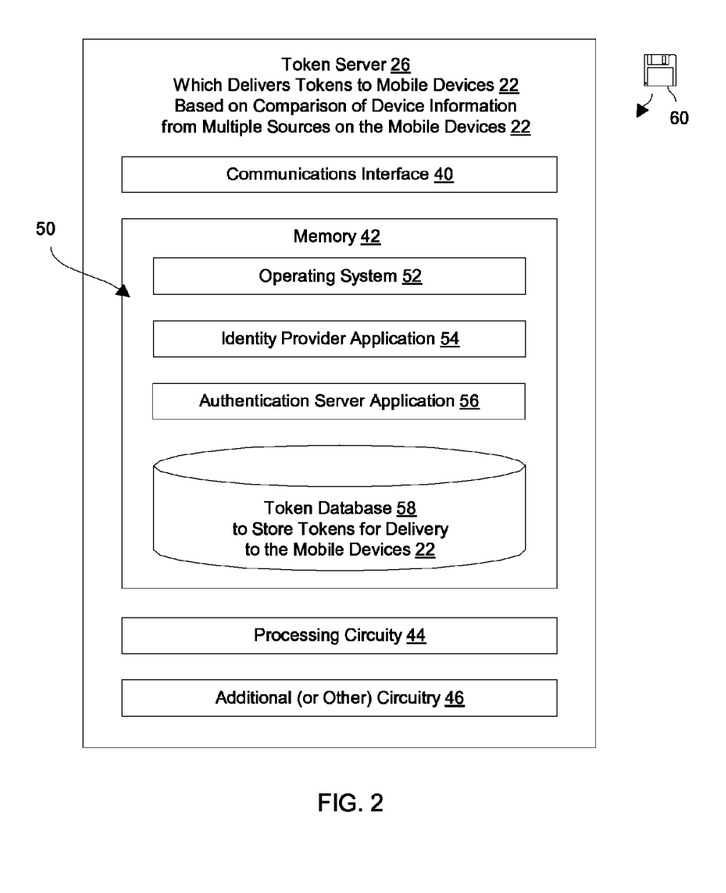
FIG. 2 is a block diagram of a token server of the electronic environment of FIG. 1.

FIG. 2 shows particular details of the token server 26 (also see FIG. 1). The token server 26 includes a communications interface 40, memory 42, processing circuitry 44, and additional (or other) circuitry 46.

The communications interface 40 is constructed and arranged to connect the token server 26 to the communications medium 30 to enable communications with other components of the electronic environment 20 (FIG. 1). Such communications may be IP-based, cellular-based, cable-based, combinations thereof, and so on. Accordingly, the communications interface 40 enables the token server 26 to communicate with the mobile devices 22 and the resource servers 24 to perform authentication and deliver tokens to enable the mobile devices 22 to access resources of the resource servers 24.

The memory 42 is intended to represent both volatile storage (e.g., DRAM, SRAM, etc.) and non-volatile storage (e.g., flash memory, etc.). The memory 42 stores a variety of software constructs 50 including an operating system 52 to manage computer resources of the token server 26, an identity provider (IDP) application 54 to operate as an specialized identity provider, an authentication application 56 to operate as a specialized authentication server, and a token database 58 (i.e., a database of generated tokens for distribution to the mobile devices 22).

The processing circuitry 44 is constructed and arranged to operate in accordance with the various software constructs 50 stored in the memory 42. Such circuitry 44 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 60 is capable of delivering all or portions of the software constructs 50 to the token server 26. The computer program product 60 has a non-transitory (or non-volatile) computer readable medium which stores a set of instructions which controls one or more operations of the token server 26. Examples of suitable computer readable storage media include tangible articles of manufacture and apparatus which store instructions in a non-volatile manner such as CD-ROM, flash memory, disk memory, tape memory, and the like.

The additional circuitry 46 represents other portions of the token server 26. For example, the token server 26 may include a user interface to enable a user such as an administrator to enter input and receive output (user I/O) to operate the token server 26.

During operation, the processing circuitry 44 runs in accordance with the software constructs 50. In particular, when the processing circuitry 44 runs the identity provider application 54, an identity provider server is formed which responds to token requests from the mobile devices 22. Similarly, when the processing circuitry 44 runs the authentication application 56, an authentication server is formed which performs user authentication as well as generates tokens (or assertions) for use by the mobile devices 22 to enable their users to access resources of the resource servers 24 (FIG. 1).

As will be explained in further detail shortly, the authentication server provides token identifiers (or handles) back to the mobile devices 22 and sends the tokens to IDP server which then stores the tokens in the token database 58. When the mobile devices 22 provide the token identifiers to the IDP server, the IDP server then distributes the actual tokens to the mobile devices 22. Further details will now be provided with reference to FIG. 3.

Figure 3:
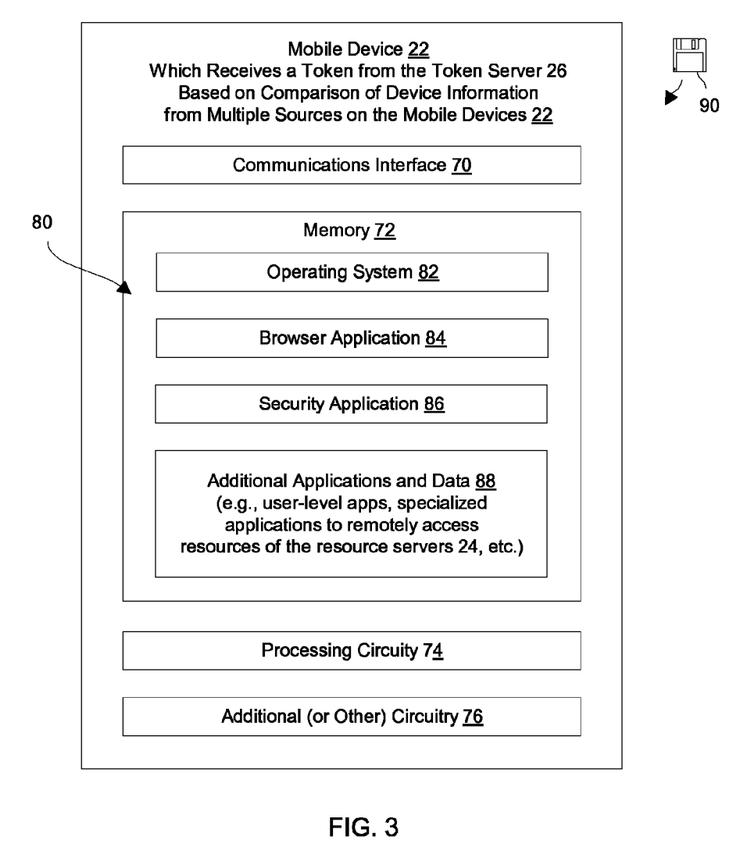
FIG. 3 is a block diagram of a mobile device of the electronic environment of FIG. 1.

FIG. 3 shows particular details of a mobile device 22 (also see FIG. 1). The mobile device 22 includes a communications interface 70, memory 72, processing circuitry 74, and additional (or other) circuitry 76. Furthermore, the mobile device 22 may have a small, handheld form factor such as that of a smart phone, a tablet, a personal digital assistant or organizer, and so on.

The communications interface 70 is constructed and arranged to connect the mobile device 22 to the communications medium 30 to enable communications with other components of the electronic environment 20 (FIG. 1). Such communications may be IP-based, cellular-based, cable-based, combinations thereof, and so on. Accordingly, the communications interface 70 enables the mobile devices 22 to communicate with the resource servers 24 and the token server 26 to perform authentication and obtain tokens which enable the mobile devices 22 to access resources of the resource servers 24.

The memory 72 is intended to represent both volatile storage (e.g., DRAM, SRAM, etc.) and non-volatile storage (e.g., flash memory, etc.). The memory 72 stores a variety of software constructs 80 including an operating system 82 to manage computer resources of the mobile device 22, a browser application 84 to access various resources and services of the electronic environment 20, a security application 86 to collect device information including device fingerprints and user biometrics, and additional applications and data 88 (e.g., user-level apps, operating parameters, tokens, certificates, cryptographic resources, etc.).

The processing circuitry 74 is constructed and arranged to operate in accordance with the various software constructs 80 stored in the memory 72. Such circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the mobile device 22 (e.g., directly to the mobile device 22 or indirectly via a peripheral component). The computer program product 90 has a non-transitory (or non-volatile) computer readable medium which stores a set of instructions which controls one or more operations of the mobile device 22. Examples of suitable computer readable storage media include tangible articles of manufacture and apparatus which store instructions in a non-volatile manner such as CD-ROM, flash memory, disk memory, tape memory, and the like.

The additional circuitry 76 represents other portions of the mobile device 22. For example, the mobile device 22 may include a user interface such as a touch screen to enable a user to conveniently enter input and receive output (user I/O) to operate the mobile device 22.

During operation, the processing circuitry 74 runs in accordance with the software constructs 80. In particular, when the processing circuitry 74 runs the browser application 84, mobile browser circuitry (or simply mobile browser) is formed which accesses various components of the electronic environment 20. Similarly, when the processing circuitry 74 runs the security application 86, security circuitry (or simply a security module) is formed which gathers device fingerprints from the mobile device 22 and biometrics from the user, and communicates this device information to the token server 26 as part of an authentication process to obtain a token (or an assertion) from the token server 26 to access resources of the resource servers 24 (FIG. 1).

As will be explained in further detail shortly, the security module acquires a token identifier (or handle) identifying a token from the token server 26, and the mobile browser provides the token identifier to the token server 26 to obtain the token. During this process, the security module is able to report a rich set of device information and user biometrics to the token server 26 for authentication purposes. The device information from the browser must be consistent throughout the process in order for the browser to obtain the token and the provide the token to a resource server 24 to obtain access to a resource of the resource server 24. Further details will now be provided with reference to FIG. 4.

Figure 4:
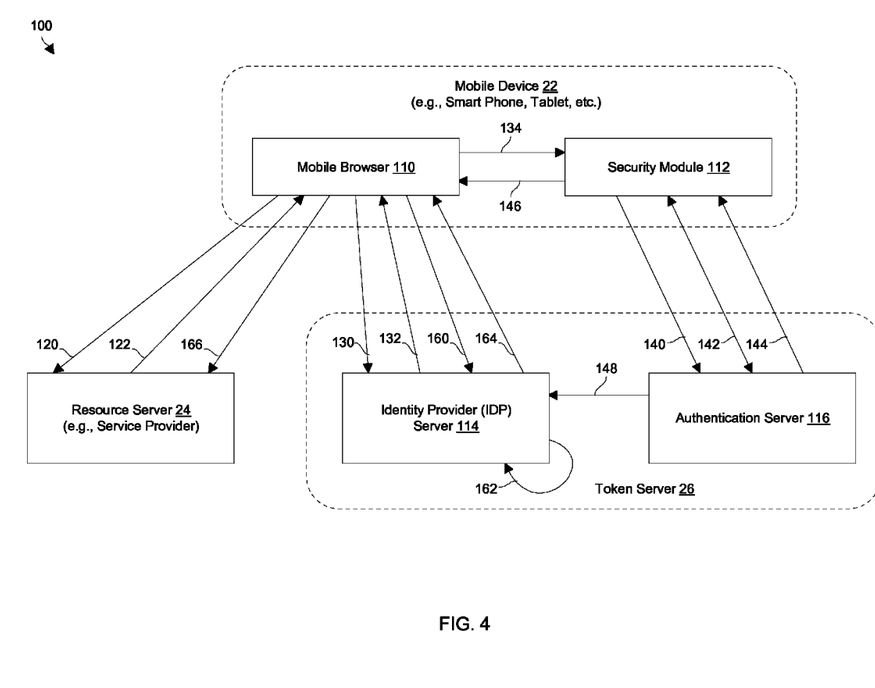
FIG. 4 is a block diagram illustrating certain messaging details during token delivery within the electronic environment of FIG. 1.

FIG. 4 shows particular messaging details of a token delivery process 100 which involves a mobile device 22, a resource server 24, and the token server 26. It should be understood that for each message, there may actually be more than one communication exchanged between devices (e.g., DNS resolution, connection establishment and handshaking, etc.).

First, recall that the memory 72 of the mobile device 22 stores a variety of software constructs 80 that, when run by the processing circuitry 74 of the mobile device 22, form specialized circuits (also see FIG. 3). In particular, when the processing circuitry 74 executes the browser application 84, a mobile browser 110 is formed (FIG. 4). Similarly, when the processing circuitry 74 executes the security application 86, a security module 112 is formed (FIG. 4).

Likewise, the memory 42 of the token server 26 stores a variety of software constructs 50 that, when run by the processing circuitry 44 of the token server 26, form specialized circuits (also see FIG. 2). In particular, when the processing circuitry 44 executes the identity provider application 54, an identity provider (IDP) server 114 is formed (FIG. 4). Furthermore, when the processing circuitry 44 executes the authentication server application 56, an authentication server 116 is formed (FIG. 4). It should be understood that, in some arrangements, the IDP server 112 and the authentication server 112 are formed by separate hardware.

Now, suppose that the user of the mobile device 22 wishes to access a resource of the resource server 24. For example, the user may wish to gain access to particular CRM resources from a CRM service provider. To start the process 100, the user directs the mobile browser 110 of the mobile device 22 to send an access request message 120 to the resource server 24.

In response to the access request message 120, the resource server 24 provides a redirection message 122 to the mobile browser 110. In particular, the resource server 24 redirects the mobile browser to the IDP server 114 of the token server 26 (e.g., via a URL to the IDP server 114).

Next, the mobile browser 110 sends a token request message 130 to the IDP server 114. The token request message 130 includes a user identifier which identifies the user of the mobile device 22 and device information which identify certain details of the mobile device 22. Examples of suitable device information include device fingerprints such as a source IP address, browser version, message header information, and so on. As will be explained in further detail shortly, the device information will be used to bind the token.

In response to the token request message, the IDP server 114 returns a security module message 132 directing the mobile browser to launch the security application 86 (FIG. 3). In particular, the IDP server 114 determines that, based on the user identifier and policy, the user must authenticate and provides a special URL which invokes the security application 86. As shown by the arrow 134, the processing circuitry 74 runs the security application 86 to form the security module 112.

Next, the security module 112 sends an authentication message 140 including the user identifier to the authentication server 116. Subsequently, as shown by the double arrow 142, the security module 112 and the authentication server 116 communicate with each other to exchange credentials and further device information to securely authenticate the user. Such communications are out-of-band with the mobile browser 110, and include advanced device information beyond that available via the mobile browser 110. In particular, the device information can include the same device fingerprints that were provided by the mobile browser as well as other device fingerprints such as certificates, mobile device identifiers, GPS data, and so on. Furthermore, the device information may include biometrics collected by the security module 112 such as facial recognition data, voice recognition data, fingerprint scan data, and so on. Such advanced device information is then treated by the authentication server 116 as a set of authentication factors to securely authenticate the user.

In some arrangements, the authentication server 116 performs adaptive authentication in which the authentication server 116 compares current authentication factors to those of a stored user profile (based on the user identifier) to generate a risk score (i.e., a numerical measure of risk) which is compared to a predefined risk threshold. If the generated risk score is lower than the predefined risk threshold, authentication is considered successful. However, if the risk score is higher than the predefined risk threshold, authentication is considered unsuccessful and a remedial action may be taken (e.g., re-authentication, step up authentication, application of a different form of authentication, triggering of an alarm, etc.).

Once authentication is successful, the authentication server 116 sends an authentication response message 144 to the security module 112 of the mobile device 22. The authentication response message 144 includes a token identifier that allows retrieval of the token (i.e., an access or ID token such as a SAML token or assertion). Accordingly, the token identifier is essentially a handle to the token.

The authentication response message 144 directs the security module 112 to launch the browser application 84 to form the mobile browser 110, and then point the mobile browser 110 to the IDP server 114 and to supply the token identifier. As shown by the arrow 146, the processing circuitry 74 runs the security module application 84 to form the security module 112.

Additionally, the authentication server 116 provides a message 148 to the IDP server 114 containing the full token (or assertion). In some arrangements, the message 148 further contains device information that the authentication server 116 gathered from the security module 112 and used by the authentication server 116 to authenticate the user. It should be understood that the IDP server 114 may service multiple users simultaneously and thus store the full token in a token database 58 which is indexed by token identifier and/or user identifier (also see FIG. 2).

Upon receipt of the token handle by the browser 110 of the mobile device 22 (arrow 146), the browser 110 sends a token request message 160 including the user identifier, the token identifier and device information to the IDP server 114. The device information contained in the token request message 160 includes mobile device identifying data which is similar to that of the earlier token request message 130. For example, the device information may include device fingerprints such as a source IP address, browser version, message header information, and so on.

At this point, the IDP server 114 performs exact matching on the device information collected by the token request message 160 and the earlier token request message 130. Such matching confirms that the token server 26 continues to communicate with the mobile device 22 of the legitimate user and effectively binds the token to the mobile device 22. In some arrangements, the IDP server 114 performs additional matching between the device information collected from the token request message 160 and device information supplied to the IDP server 114 from the authentication server 116 (arrow 148) which was gathered from the security module 112. These operations which check for consistency among the device information are represented by arrow 162.

If there is inconsistency in the device information, there is a greater possibility that an attacker is involved and that the token server 26 is no longer communicating with the mobile device 22 of the legitimate user. Rather, a malicious person may have somehow intercepted one of the communications between the mobile device 22 of the legitimate user and the token server 26 and is now trying to obtain access using a different device. In such a situation (i.e., a session hijack), the token server 26 does not provide the token but instead blocks access and sends a message 164 rejecting the token request. Additionally, the token server 26 may take remedial action such as sending an alert to an administrator and/or to the actual user, collect more information from the new apparatus on the incident, save a comprehensive record of the event, and so on.

However, if there is consistency in the device information (i.e., the data and policy are verified), the IDP server 114 provides a message 164 which contains the token. In particular, the IDP server 114 retrieves the token from the token database 58 (FIG. 2), and sends the token to the mobile browser 110. In some arrangements, the token is relatively large (e.g., a SAML token or assertion) and the message 164 carries the token in the form of an HTML post back call (e.g., HTTP/POST).

Upon receipt of the message 164 containing the token, the mobile browser 110 sends a message 166 containing the token to the resource server 24 (e.g., a service provider). As a result, the resource server 24 then safely provides the mobile device 22 with access to the resource.

It should be understood that the above-described process 100 allows the resource server 24 to continue using basic access flows which involve bearer tokens (e.g., basic SAML flows). That is, there is no need to invoke any additional service to validate or provide the token from the perspective of a third-party service provider.

It should be further understood that the token server 26 is able to perform similar processes 100 for other users of other mobile devices 22 to control access to resources on multiple resource servers 24 (also see FIG. 1). Further details will now be provided with reference to FIG. 5.

Figure 5:
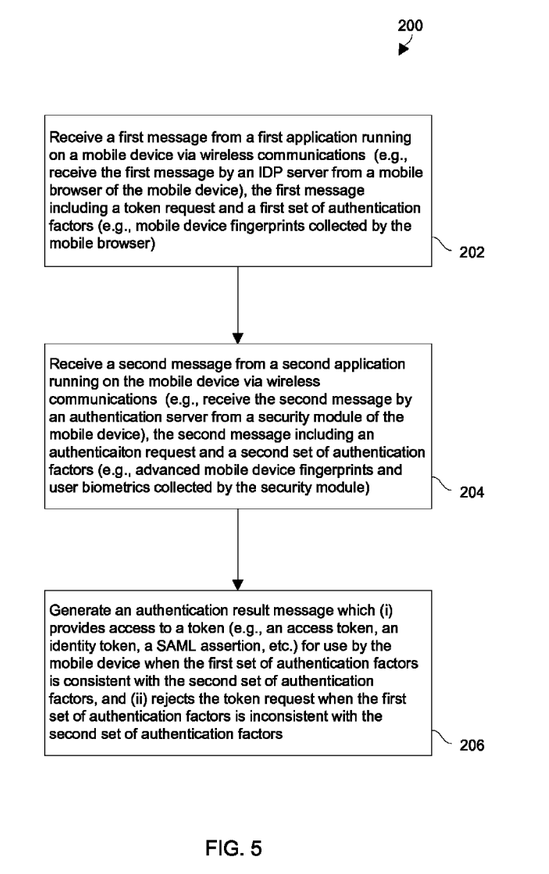
FIG. 5 is a flowchart of a procedure which is performed by the token server of FIG. 2.

FIG. 5 is a flowchart of a procedure 200 which is performed by the token server 26 (also see FIGS. 1-2). As mentioned above, the token server 26 includes an IDP server 114 and an authentication server 116 (FIG. 4).

At 202, the token server 26 receives a first message from a first application running on a mobile device via wireless communications (e.g., a browser application 84 executed by the processing circuitry 74 of the mobile device 22). The request message includes a token request and a first set of authentication factors (e.g., see message 130 in FIG. 4).

At 204, the token server 26 receives a second message from a second application running on the mobile device via wireless communications (e.g., a security application 86 executed by the processing circuitry 74 of the mobile device 22). The second message including an authentication request and a second set of authentication factors (e.g., see messages 140, 142 in FIG. 4).

At 206, the token server 26 generates an authentication result message which (i) provides access to a token for use by the mobile device when the first set of authentication factors is consistent with the second set of authentication factors, and (ii) rejects the token request when the first set of authentication factors is inconsistent with the second set of authentication factors. In particular, the token server 26 compares device information obtained by the first and second messages and provides access to the token only if the device information matches. Otherwise, the token server 26 denies access to the token due to the possibility of use of an unauthentic device by a malicious person (i.e., an attacker who has stolen the device information from the mobile device 22 of the legitimate user).

As described above, improved techniques are directed to delivery of a token from a token server 26 to a mobile device 22 which runs two different applications, i.e., a browser application 84 and a separate security application 86, both of which provide device information to the token server 26. The separate security application 86 may be provided to the mobile device 22 and installed in the mobile device 22 of the legitimate user in a highly secure manner. The token server 26 is then able to compare the device information from two independent sources 110, 112 of the mobile device 22 rather than rely solely on device information from mobile device's browser 110 (i.e., a potential security weak point). The token server 26 is then able to confirm that the device information from both sources 110, 112 is consistent before delivering the token to the mobile device 22.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources of the token server 26 may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the IDP server 114 and the authentication server 116 were described above as forming the token server 26. In some arrangements, there is more partitioning of the IDP server 114 and the authentication server 116 (e.g., in separate machines, controlled by separate human experts, etc.).

Furthermore, in some arrangements, the IDP server 114 provides the device information initially received from the mobile browser 110 (arrow 130 in FIG. 4) to the authentication server 116. The authentication server 116 then uses this device information during user authentication (arrows 140, 142) before providing the token identifier to the security module 112 (arrow 114). Such operation provides for stronger user authentication by the authentication server 116. Such modifications and enhancements are intended to belong to various embodiments of the disclosure.

What is claimed is:

1. A method of performing authentication, the method comprising:

receiving, by processing circuitry, a first message from a first application running on a client device, the first message including a token request and a first set of authentication factors;

receiving, by the processing circuitry, a second message from a second application running on the client device, the second message including an authentication request and a second set of authentication factors; and generating, by the processing circuitry, an authentication result message which (i) provides access to a token for use by the client device when the first set of authentication factors is consistent with the second set of authentication factors, and (ii) rejects the token request when the first set of authentication factors is inconsistent with the second set of authentication factors;

wherein the client device is a mobile device; wherein the first message is received via wireless communications;

wherein the second message is received via wireless communications;

wherein receiving the first message from the first application running on the mobile device includes obtaining the first message from a browser application which is constructed and arranged to access a resource from a service provider (SP) server;

wherein receiving the second message from the second application running on the mobile device includes obtaining the second message from a security application which is constructed and arranged to (i) collect the second set of authentication factors on the mobile device and (ii) send the second set of authentication factors to the processing circuitry independently of the browser application running on the mobile device;

wherein the processing circuitry includes (i) an identity provider (IDP) server and (ii) an authentication server;

wherein obtaining the first message from the browser application includes acquiring the first set of authentication factors by the IDP server;

wherein obtaining the second message from the security application includes acquiring the second set of authentication factors by the authentication server in a manner which is out of band of the IDP server; and wherein the method further comprises:

receiving, by the IDP server, another message from the browser application running on the mobile device via wireless communications, the other message including a token identifier which identifies the token, and providing, by the IDP server, a response message to the mobile device in response to the other message from the browser application.

2. A method as in claim 1 wherein the other message from the browser application further includes a third set of authentication factors;

wherein the response message includes the token for use by the mobile device when the IDP server successfully matches the first set of authentication factors with the third set of authentication factors; and wherein the response message includes a token rejection when the IDP server does not successfully match the first set of authentication factors with the third set of authentication factors.

3. A method as in claim 1, further comprising:

selecting a particular token from multiple tokens stored in a token database of the IDP server based on the token identifier, the response message including the particular token selected from multiple tokens stored in the token database of the IDP server.

4. A method as in claim 3, further comprising:

delivering the token from the authentication server to the IDP server for storage in the token database in a manner which is out of band with the mobile device.

5. A method as in claim 3 wherein the particular token is a bearer token that authenticates a user to the SP server in accordance with a bearer subject confirmation method.

6. A method as in claim 1, further comprising:

providing, by the IDP server, an augmented universal resource locator (URL) string in response to the first message from the browser application, the augmented URL string directing the browser application to automatically launch the security application on the mobile device.

7. A method as in claim 1 wherein the first set of authentication factors of the first message includes a first set of mobile device fingerprints which distinguish the mobile device from other mobile devices;

wherein the second set of authentication factors of the second message includes a second set of mobile device fingerprints which distinguish the mobile device from other mobile devices; and wherein the method further comprises comparing the first set of mobile device fingerprints to the second set of mobile device fingerprints to determine whether the first message and the second message were received from the same mobile device.

8. A method as in claim 1 wherein the first set of authentication factors of the first message includes a first set of biometric data;

wherein the second set of authentication factors of the second message includes a second set of biometric data; and wherein the method further comprises comparing the first set of biometric data to the second set of biometric data to determine whether the first message and the second message were received from the same user.

9. A method of obtaining access to a token from a mobile device, the method comprising:

providing, by the mobile device, a first message from a first application running on the mobile device to remote processing circuitry via wireless communications, the first message including a token request and a first set of authentication factors;

providing, by the mobile device, a second message from a second application running on the mobile device to the remote processing circuitry via wireless communications, the second message including an authentication request and a second set of authentication factors; and receiving, by the mobile device, an authentication result message from the remote processing circuitry, the authentication result message (i) providing access to a token for use by the mobile device when the first set of authentication factors is consistent with the second set of authentication factors, and (ii) rejecting the token request when the first set of authentication factors is inconsistent with the second set of authentication factors;

wherein providing the first message from the first application running on the mobile device includes sending the first message using a browser application which is constructed and arranged to access a resource from a service provider (SP) server;

wherein providing the second message from the second application running on the mobile device includes sending the second message using a security application which is constructed and arranged to (i) collect the second set of authentication factors on the mobile device and (ii) send the second set of authentication factors to the remote processing circuitry independently of the browser application running on the mobile device;

wherein the remote processing circuitry includes (i) an identity provider (IDP) server and (ii) an authentication server;

wherein sending the first message using the browser application includes transmitting the first set of authentication factors to the IDP server;

wherein sending the second message from the security application includes transmitting the second set of authentication factors to the authentication server in a manner which is out of band of the IDP server; and wherein the method further comprises:

providing, by the mobile device, another message to the IDP server from the browser application running on the mobile device via wireless communications, the other message including a token identifier which identifies the token, and receiving, by the mobile device, a response message from the IDP server in response to the other message from the browser application.

10. A method as in claim 9 further comprising:

receiving an augmented universal resource locator (URL) string from the IDP server in response to the first message, and in response to the URL string, automatically launching the security application on the mobile device.

11. A method as in claim 9, further comprising:

collecting a first set of user biometric data for inclusion in the first set of authentication factors of the first message; and collecting a second set of user biometric data for inclusion in the second set of authentication factors of the second message.

12. A method as in claim 9 wherein the other message from the browser application further includes a third set of authentication factors;

wherein the response message includes the token for use by the mobile device when the IDP server successfully matches the first set of authentication factors with the third set of authentication factors; and wherein the response message includes a token rejection when the IDP server does not successfully match the first set of authentication factors with the third set of authentication factors.

13. A method as in claim 9 wherein the IDP server selects a particular token from multiple tokens stored in a token database of the IDP server based on the token identifier, the response message including the particular token selected from multiple tokens stored in the token database of the IDP server.

14. A method as in claim 13 wherein the token is delivered from the authentication server to the IDP server for storage in the token database in a manner which is out of band with the mobile device.

15. A method as in claim 13 wherein the particular token is a bearer token that authenticates a user to the SP server in accordance with a bearer subject confirmation method.

16. A computer program product having a non-transitory computer readable medium which stores a set of instructions to perform authentication, the set of instructions, when carried out by computerized circuitry, causing the computerized circuitry to perform a method of:

receiving, by the computerized circuitry, a first message from a first application running on the mobile device via wireless communications, the first message including a token request and a first set of authentication factors;

receiving, by the computerized circuitry, a second message from a second application running on the mobile device via wireless communications, the second message including an authentication request and a second set of authentication factors; and generating, by the computerized circuitry, an authentication result message which (i) provides access to a token for use by the mobile device when the first set of authentication factors is consistent with the second set of authentication factors, and (ii) rejects the token request when the first set of authentication factors is inconsistent with the second set of authentication factors;

wherein receiving the first message from the first application running on the mobile device includes obtaining the first message from a browser application which is constructed and arranged to access a resource from a service provider (SP) server;

wherein receiving the second message from the second application running on the mobile device includes obtaining the second message from a security application which is constructed and arranged to (i) collect the second set of authentication factors on the mobile device and (ii) send the second set of authentication factors to the processing circuitry independently of the browser application running on the mobile device;

wherein the computerized circuitry includes (i) an identity provider (IDP) server and (ii) an authentication server;

wherein obtaining the first message from the browser application includes acquiring the first set of authentication factors by the IDP server;

wherein obtaining the second message from the security application includes acquiring the second set of authentication factors by the authentication server in a manner which is out of band of the IDP server; and wherein the method further comprises:

receiving, by the IDP server, another message from the browser application running on the mobile device via wireless communications, the other message including a token identifier which identifies the token, and providing, by the IDP server, a response message to the mobile device in response to the other message from the browser application.

17. A computer program product as in claim 16 wherein the other message from the browser application further includes a third set of authentication factors;

wherein the response message includes the token for use by the mobile device when the IDP server successfully matches the first set of authentication factors with the third set of authentication factors; and wherein the response message includes a token rejection when the IDP server does not successfully match the first set of authentication factors with the third set of authentication factors.

18. A computer program product as in claim 16, further comprising:

selecting a particular token from multiple tokens stored in a token database of the IDP server based on the token identifier, the response message including the particular token selected from multiple tokens stored in the token database of the IDP server.

19. A computer program product as in claim 18, further comprising:

delivering the token from the authentication server to the IDP server for storage in the token database in a manner which is out of band with the mobile device.

20. A computer program product as in claim 18 wherein the particular token is a bearer token that authenticates a user to the SP server in accordance with a bearer subject confirmation method.

21. A method of performing authentication, the method comprising:

receiving, by processing circuitry, a first message from a first application running on a client device, the first message including a token request and a first set of authentication factors;

receiving, by the processing circuitry, a second message from a second application running on the client device, the second message including an authentication request and a second set of authentication factors; and generating, by the processing circuitry, an authentication result message which (i) provides access to a token for use by the client device when the first set of authentication factors is consistent with the second set of authentication factors, and (ii) rejects the token request when the first set of authentication factors is inconsistent with the second set of authentication factors;

wherein the client device is a mobile device; wherein the first message is received via wireless communications;

wherein the second message is received via wireless communications;

wherein receiving the first message from the first application running on the mobile device includes obtaining the first message from a browser application which is constructed and arranged to access a resource from a service provider (SP) server;

wherein receiving the second message from the second application running on the mobile device includes obtaining the second message from a security application which is constructed and arranged to (i) collect the second set of authentication factors on the mobile device and (ii) send the second set of authentication factors to the processing circuitry independently of the browser application running on the mobile device;

wherein the processing circuitry includes (i) an identity provider (IDP) server and (ii) an authentication server;

wherein obtaining the first message from the browser application includes acquiring the first set of authentication factors by the IDP server;

wherein obtaining the second message from the security application includes acquiring the second set of authentication factors by the authentication server in a manner which is out of band of the IDP server;

wherein the method further comprises providing, by the IDP server, an augmented universal resource locator (URL) string in response to the first message from the browser application, the augmented URL string directing the browser application to automatically launch the security application on the mobile device; and wherein, when the authentication result message provides access to the token for use by the mobile device, the authentication result message includes a token identifier and directs the security application running on the mobile device to point the browser application to the IDP server to retrieve the token from the IDP server using the token identifier.

\* \* \* \* \*